US008953527B2

(12) United States Patent
Grandblaise et al.

(10) Patent No.: US 8,953,527 B2
(45) Date of Patent: Feb. 10, 2015

(54) ORTHOGONAL FREQUENCY DOMAIN MULTIPLEXING (OFDM) COMMUNICATION SYSTEM

(75) Inventors: David Grandblaise, Paris (FR); Jean-Christophe Dunat, Montrouge (FR)

(73) Assignee: Google Technology Holdings LLC, Libertyville, IL (US)

(*) Notice: Subject to any disclaimer, the term of this patent is extended or adjusted under 35 U.S.C. 154(b) by 1284 days.

(21) Appl. No.: 12/306,768

(22) PCT Filed: Jun. 8, 2007

(86) PCT No.: PCT/US2007/070684
§ 371 (c)(1),
(2), (4) Date: Sep. 16, 2009

(87) PCT Pub. No.: WO2008/005649
PCT Pub. Date: Jan. 10, 2008

(65) Prior Publication Data
US 2010/0020760 A1    Jan. 28, 2010

(30) Foreign Application Priority Data
Jul. 5, 2006  (GB) .................................. 0613370.6

(51) Int. Cl.
*H04W 4/00* (2009.01)
*H04L 5/02* (2006.01)
(Continued)

(52) U.S. Cl.
CPC .............. *H04L 5/023* (2013.01); *H04B 7/2615* (2013.01); *H04W 72/0406* (2013.01);
(Continued)

(58) Field of Classification Search
USPC ................................................. 370/328–330
See application file for complete search history.

(56) References Cited

U.S. PATENT DOCUMENTS 6,161,024 A    12/2000 Komara
6,928,061 B1 *  8/2005 Garcia-Luna-Aceves et al. ............................ 370/329
(Continued)

FOREIGN PATENT DOCUMENTS

EP        1 526 674 A1    4/2005
WO   WO 02-31991 A2       4/2002

OTHER PUBLICATIONS

Dunat et al., "Collaborative Allocation of Orthogonal Frequency Division Multiplex Sub-Carriers using the Swarm Intelligence", Journal of Communications, vol. 1, No. 1, Apr. 2006, pp. 68-76.*
(Continued)

*Primary Examiner* — Brandon Renner
*Assistant Examiner* — Scott M Sciacca
(74) *Attorney, Agent, or Firm* — Honigman Miller Schwartz and Cohn LLP

(57) ABSTRACT

An OFDM communication system employs a cell time division time frame for a plurality of overlapping cells wherein the time frame comprises time slots with each time slot allocated to one of the overlapping cells and each time slot being either an information exchange time slot or a data time slot. Remote nodes (101-105) transmit resource requests for at least one subcarrier in a data time slot to one or more of the central nodes (107, 109) in the information exchange time slots of those nodes (107, 109). The central nodes (107, 109) broadcast information of uplink channel characteristics received in the request messages and the remote nodes (101-105) use this to determine whether to abandon or continue the resource request. Eventually, the remote node may decide to use the resource and thus to transmit in the associated data time slot. A distributed multi-cell resource allocation can be achieved based on distributed decisions in the remote stations.

10 Claims, 7 Drawing Sheets

(51) Int. Cl.
   H04B 7/26 (2006.01)
   H04W 72/04 (2009.01)
   H04L 27/26 (2006.01)
   H04W 48/08 (2009.01)
   H04W 48/16 (2009.01)
   H04W 48/20 (2009.01)
   H04W 74/04 (2009.01)

(52) U.S. Cl.
   CPC ........... *H04L 27/2608* (2013.01); *H04W 48/08* (2013.01); *H04W 48/16* (2013.01); *H04W 48/20* (2013.01); *H04W 74/04* (2013.01)
   USPC ............................ 370/329; 370/336; 370/343

(56) References Cited

U.S. PATENT DOCUMENTS

| | | | | |
|---|---|---|---|---|
| 7,301,990 | B2* | 11/2007 | Jayaraman et al. | 375/148 |
| 2002/0077152 | A1* | 6/2002 | Johnson et al. | 455/562 |
| 2004/0095880 | A1 | 5/2004 | Laroia et al. | |
| 2004/0203814 | A1* | 10/2004 | Ho et al. | 455/450 |
| 2005/0009532 | A1* | 1/2005 | Cuffaro et al. | 455/452.2 |
| 2005/0036441 | A1 | 2/2005 | Laroia et al. | |
| 2006/0083189 | A1 | 4/2006 | Laroia et al. | |
| 2007/0097899 | A1* | 5/2007 | Larsson et al. | 370/318 |
| 2007/0213046 | A1* | 9/2007 | Li et al. | 455/425 |
| 2007/0280175 | A1* | 12/2007 | Cheng et al. | 370/338 |

OTHER PUBLICATIONS

Jean-Christophe Dunat, et al., "Efficient OFDMA Distributed Optimization Algorithm Exploiting Multi-User Diversity," IEEE Proceedings of the 1st international Symposium on New Frontiers in Dynamic Spectrum Access Networks (DySPAN), Nov. 8-11, 2005, pp. 233-242.

Owen Wheeler, "Search Report under Section 17," United Kingdom Patent Office, Oct. 3, 2006.

Lee W. Young, "PCT International Search Report and Written Opinion," WIPO, ISA/US, Feb. 20, 2008.

Lawlor, et al., "A Self Organizing Social Insect Model for Dynamic Frequency Allocation in Cellular Telephone Networks," Proceedings of the 2nd international Joint Conference on Autonomous Agents and Multiagent Systems, AAMAS'03, Melbourne, Australia, Jul. 14-18, 2003, pp. 1048-1049.

Berlemann, et al., "Spectrum Load Smoothing for Cognitive Medium Access in Open Spectrum," IEEE 16th International Symposium on Personal, Indoor and Mobile Radio Communications, 2005, PIMRC 2005, Sep. 11-14, 2005, vol. 3, pp. 1951-1956.

* cited by examiner

ORTHOGONAL FREQUENCY DOMAIN MULTIPLEXING (OFDM) COMMUNICATION SYSTEM

FIELD OF THE INVENTION

The invention relates to an orthogonal frequency domain multiplexing (OFDM) communication system and in particular, but not exclusively, to an OFDM based Wireless Local Area Network.

BACKGROUND OF THE INVENTION

The available spectrum resource for radio communication systems is a significantly limited and expensive resource. Furthermore, the spectrum bands do not all have the same economic potential for use by commercial radio communication systems. Indeed, the most useful frequencies (300 MHz-3 GHz) are currently almost entirely allocated to existing systems. However, several measurement campaigns conducted in several countries have shown that many of the allocated bands tend to be only sparsely used, i.e. not all the frequency resource is used all the time and everywhere.

Thus, spectrum availability holes tend to exist in the allocated bands allowing for a potential reuse of such unused resource between various systems. Due to the tremendous increase in the demand for communication resource for wireless systems, a more flexible allocation of the spectrum resource is a high priority for regulators and operators in order to provide a more efficient use of the available resource.

However, current spectrum resource planning techniques tend to lead to over dimensioned networks with underused spectrum. Furthermore, conventional resource planning tends to be inflexible and use large centralised decision processes resulting in slow and resource demanding adaptation of a system to the current conditions.

Wireless terminals have gained more and more computation capabilities in recent years. In the near future, cognitive radios will be environment-aware, i.e. they will e.g. be able to sense their local environment, to communicate with other communication units using several air interfaces and to adapt to local environment variations. To reach such an increased level of intelligence, smart algorithms for spectrum allocation are desired and in particular a dynamic and distributed planning is desired.

The application of distributed resource allocation processes exploiting such computational capabilities can promise improved frequency resource allocation. However, although a system employing distributed and dynamic frequency management may be able to adapt the spectrum allocation to the current conditions and spatial distribution of users, it requires robust and flexible algorithms.

An example of distributed frequency resource management in an Orthogonal Frequency Division Multiplex (OFDM) system is disclosed in "Efficient OFDMA distributed optimization algorithm exploiting multi-user diversity" by J. C. Dunat, D. Grandblaise, and C. Bonnet, DySPAN 2005, 1$^{st}$ IEEE International Symposium on New Frontiers in Dynamic Spectrum Access Networks, Nov. 8-11, 2005, Baltimore, US.

The described system uses a distributed decision process wherein a communication unit interested in transmitting data to a central communication unit transmits an indication of the air interface channel quality to the central communication unit. The central communication unit then broadcasts information of the received channel qualities for a given time slot and the individual communication nodes independently decide whether to use the specific time slot depending on the information from the central communication unit. The system uses a distributed meta-heuristic inspired from the observation of the behaviour of social insects for distributed tasks allocation. Such methods of swarm intelligence require no external control to converge to a global optimum using only local interactions of agents.

However, the described system is relatively inflexible and although it can provide efficient resource utilisation within a single cell, the resource utilisation of the system as a whole is not necessarily optimised.

Hence, an improved OFDM communication system would be advantageous and in particular a system allowing increased flexibility, facilitated resource management, reduced complexity and/or improved resource utilisation would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the communication system comprising: a plurality of remote nodes each comprising: means for determining a requirement for uplink resource; selection means for determining a first central node from which to request uplink resource; means for determining a channel characteristic for the uplink communication channel between the remote node and the first central node; means for determining a first information exchange time slot of the time frame allocated to the first central node; request transmitting means for transmitting a resource request for at least one subcarrier of a data time slot to the first central node in the first information exchange time slot, the resource request comprising an indication of the channel characteristic; means for receiving an indication message from the first central node in the first information exchange time slot, the indication message comprising a combined channel indication of the received channel conditions for all received resource requests for the at least one subcarrier in the first information exchange time slot; deciding means for deciding to abandon the resource request or to repeat the transmission of the resource request or to use the at least one subcarrier in the data time slot; and means for transmitting uplink data to the first central node on the at least one subcarrier in the data time slot if the deciding means decides to use the at least one subcarrier in the time slot.

The invention allows improved resource utilisation and may in particular allow improved resource utilisation in a system with distributed remote node based resource decisions. A more flexible and/or more efficient resource utilisation can be achieved by providing a system allowing remote nodes to make independent decisions on utilisation of resources of a plurality of cells.

The system may allow efficient resource management and/or utilisation without necessitating a complex, centralised and/or resource demanding resource management process.

The system may allow an efficient distributed decision process wherein remote nodes can make independent decisions to select to use uplink resource from different cells. The system may allow an efficient distribution of resource utilisation by remote nodes over a plurality of cells. The system may in particular allow improved performance and support for remote nodes in cell overlap or cell border areas (e.g. for so called hidden nodes).

The plurality of cells may be fully or partially overlapping.

According to an optional feature of the invention, each of the plurality of remote nodes is arranged to transmit resource requests to a plurality of central nodes in a single time frame.

This may allow improved resource management and/or utilisation. In particular, it may allow an efficient distribution of resource utilisation over a plurality of cells.

According to an optional feature of the invention, each of the plurality of remote nodes is arranged to transmit a second resource request for at least one subcarrier of a different data time slot to a second central node only if the deciding means determines to abandon the resource request for the at least one subcarrier in the data time slot of the first central node.

This may allow improved performance and/or resource utilisation. The abandonment of the resource request for the first central node may be at any time during an information exchange phase for the first central node and may in particular be at any iteration of the resource request and combined channel indication evaluation process.

According to an optional feature of the invention, each of the plurality of remote nodes is arranged to transmit a second resource request for at least one subcarrier of a different data time slot to a second central node independently of whether the deciding means determines to abandon the request for the at least one subcarrier of the data time slot of the first central node.

This may allow improved performance and/or resource utilisation. The abandonment of the resource request for the first central node may be at any time during an information exchange phase for the first central node and may in particular be at any iteration of the resource request/combined channel indication evaluation process.

According to an optional feature of the invention, the node selection means is arranged to select a plurality of central nodes from which to request uplink resource.

This may allow improved resource management and/or usage. In particular, it may allow an efficient distribution of resource utilisation over a plurality of cells.

According to an optional feature of the invention, the node selection means is arranged to determine a number of subcarrier and time slot resource units to request in response to the requirement for uplink resource.

This may allow improved resource management and/or usage. For example, a given communication service, such as a streaming video or voice communication, may have an associated requirement for a number of subcarriers and the number of subcarriers for which a remote unit contends may depend on the requirement for the given service. Thus, the higher the data rate of the service, the higher the number of subcarrier and time slot resource units to request may be.

According to an optional feature of the invention, the number of subcarrier and time slot resource units is bounded by at least one number selected from the group consisting of a minimum number of subcarrier and time slot resource units and a maximum number of subcarrier and time slot resource units.

This may provide a low complexity yet efficient means of controlling the operation of the system and in particular of controlling duration and likelihood of convergence of the resource decision process.

According to an optional feature of the invention, the selection node means is arranged to determine the maximum number of subcarrier and time slot resource units in response to a communication service associated with the resource requirement.

This may provide a low complexity yet efficient way of controlling the operation of the system and in particular of controlling duration and likelihood of convergence of the resource decision process while ensuring a sufficiently high probability that the required number of subcarrier and time slot resource units for the service is achieved.

According to an optional feature of the invention, the information exchange time slots are divided into uplink time intervals for transmitting resource requests and downlink time intervals for transmitting indication messages.

This may allow a particularly practical, robust, efficient and/or effective way of achieving a resource utilisation distribution.

According to an optional feature of the invention, a number of reserved subcarriers are reserved for downlink only transmission in at least one of the information exchange time slots and the data time slots, and the transmitting means is arranged not to transmit uplink data in the reserved subcarriers.

Thus may allow improved interference control and/or may in particular reduce interference to other cell or cell clusters in a Time Division Duplex (TDD) communication system. The reserved subcarriers may be common reserved subcarriers for the plurality of overlapping cells and/or may be common with other cells and/or cell clusters which are not part of the time frame.

According to another aspect of the invention, there is provided a remote node for an Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the remote node comprising: means for determining a requirement for uplink resource; selection means for determining a first central node from which to request uplink resource; means for determining a channel characteristic for the uplink communication channel between the remote node and the first central node; means for determining a first information exchange time slot of the time frame allocated to the first central node; means for transmitting a resource request for at least one subcarrier of a data time slot to the first central node in the first information exchange time slot, the resource request comprising an indication of the channel characteristic; means for receiving an indication message from the first central node in the first information exchange time slot, the indication message comprising a combined channel indication of the received channel conditions for all received resource requests for the at least one subcarrier in the first information exchange time slot; means for deciding to abandon the resource request or to repeat the transmission of the resource request or to use the at least one subcarrier in the data time slot; and means for transmitting uplink data to the first central node on the at least one subcarrier in the data time slot if the deciding means decides to use the at least one subcarrier in the time slot.

According to another aspect of the invention, there is provided a method of operation for an Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the method comprising: a plurality of remote nodes each performing the steps of: determining a requirement for uplink resource; determining a first central node from which to request uplink resource; determining a channel characteristic for the uplink communication channel between the remote node and the first central node; determining a first information exchange time slot of the time frame allocated to the first central node; transmitting a resource request for at least one subcarrier of a data time slot to the first central node in the first information exchange time slot, the resource request comprising an indication of the channel characteristic; receiving an indication message from the first central node in the first information exchange time slot, the indication message comprising a combined channel indication of the received channel conditions for all received requests for the at least one subcarrier in the first information exchange time slot; deciding to abandon the resource request or to repeat the transmission of the resource request or to use the at least one subcarrier in the data time slot; and transmitting uplink data to the first central node on the at least one subcarrier in the data time slot if the decision is to use the at least one subcarrier in the time slot.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Wireless Local Area Network (WLAN) using Orthogonal Frequency Division Multiplex (OFDM) communication but it will be appreciated that the invention is not limited to this application but may be applied to many other communication systems using OFDM, including for example mobile cellular communication systems.

Figure 1:
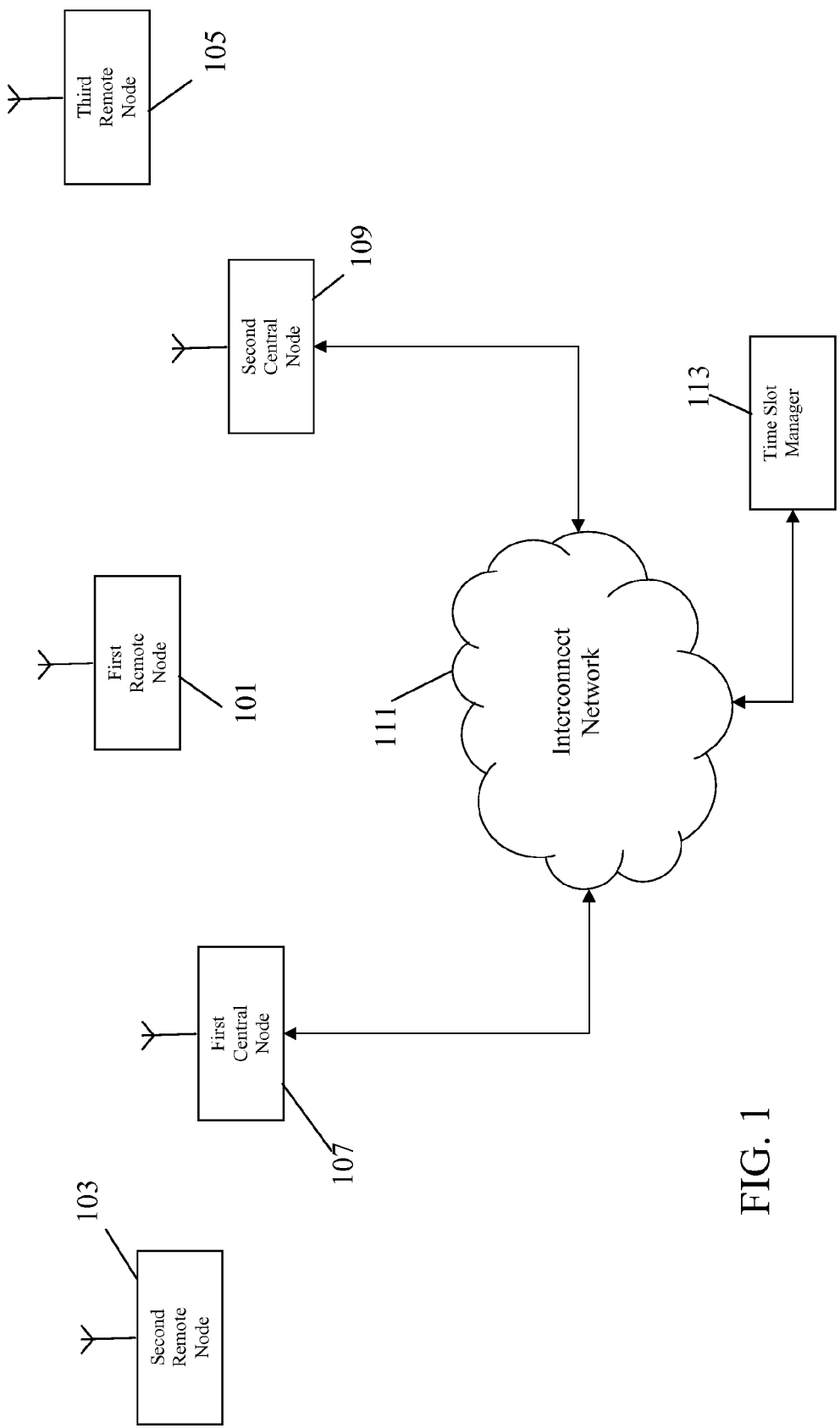
FIG. 1 illustrates an example of a cellular WLAN communication system in accordance with some embodiments of the invention.

FIG. 1 illustrates an example of a cellular WLAN communication system in accordance with some embodiments of the invention.

In the example, a number of remote nodes 101, 103, 105 are supported by a number of central nodes 107, 109. The central nodes 107, 109 are interconnected by an interconnect network 111. The central nodes 107, 109 can for example be base stations or access points and each central node 107, 109 supports a geographical area defining a cell. The cells of the different central nodes 107, 109 are in the example partially or fully overlapping cells. It will be appreciated that FIG. 1 for clarity and brevity illustrate only a few remote and central nodes and that a practical system may include a large number of remote or central nodes.

In the system, a self-organizing uplink frequency resource algorithm for multiple cooperating cells is employed to adapt the spectrum resource per remote node. The individual remote nodes make individual decisions of whether to use the available resource units following an information exchange phase and no centralised resource allocation decision functionality is necessary.

The individual remote node determines whether to use a given resource unit depending on its uplink traffic needs and current possibilities and spectrum constraints. As such, remote nodes are allocated just the required spectrum, constrained by the reuse possibility and the sharing with other users. The distributed algorithm may achieve a combined uplink spectrum allocation and scheduling which provides an efficient uplink resource utilisation based on simple, low complexity and easy to implement processes.

In the system, a group of overlapping cells are synchronised and operates in a co-ordinated fashion allowing each of the remote nodes 101-105 to access any of the cells and indeed to access a plurality of the cells at the same time. Thus, the system may allow a flexible and efficient resource allocation system that can exploit the resource of a plurality of cells based on simple distributed decisions made by the individual remote nodes 101-105. Hence, in the system, each of the remote nodes 101-105 can transmit uplink packets to all of the central nodes 107, 109 rather than just the central node to which the remote node is currently attached to. The available spectrum resource per cell can vary and can be composed of licensed and/or unlicensed spectrum bands.

In the example, all the central nodes 107, 109 are operated by the same operator and effectively provide an infrastructure domain with which the individual remote node 101-105 can communicate without being limited to a specific central node 107, 109. Thus, in the system a user is not exclusively linked to a single cell but rather to a domain comprising a plurality of central nodes 107, 109 able to route the uplink data packets to the appropriate destination.

It will be appreciated that although the example of FIG. 1 illustrates only two central nodes 107, 109 the group of cells will typically comprise a larger number of central nodes and cells.

It will be appreciated that in addition to the group of synchronised overlapping cells, the communication system may comprise other groups or clusters of cells which are not necessarily coordinated with the illustrated group of cells. In addition, other communication systems may exist in the same frequency band and may cause interference to the uplink communications.

The group of overlapping cells are time synchronised and share resource in accordance with a Time Division Multiple Access scheme. Specifically, a common time frame which comprises a plurality of time slots is used to separate the cells in the time domain. Each time slot can be allocated to one of the cells by a time slot manager 113. Furthermore, the allocated time slots may either be information exchange time slots used by the system to distribute resource information between the remote nodes 101-105 or may be data time slots which are used for uplink communication of data from the remote nodes 101-105 to the central nodes 107, 109.

Figure 2:
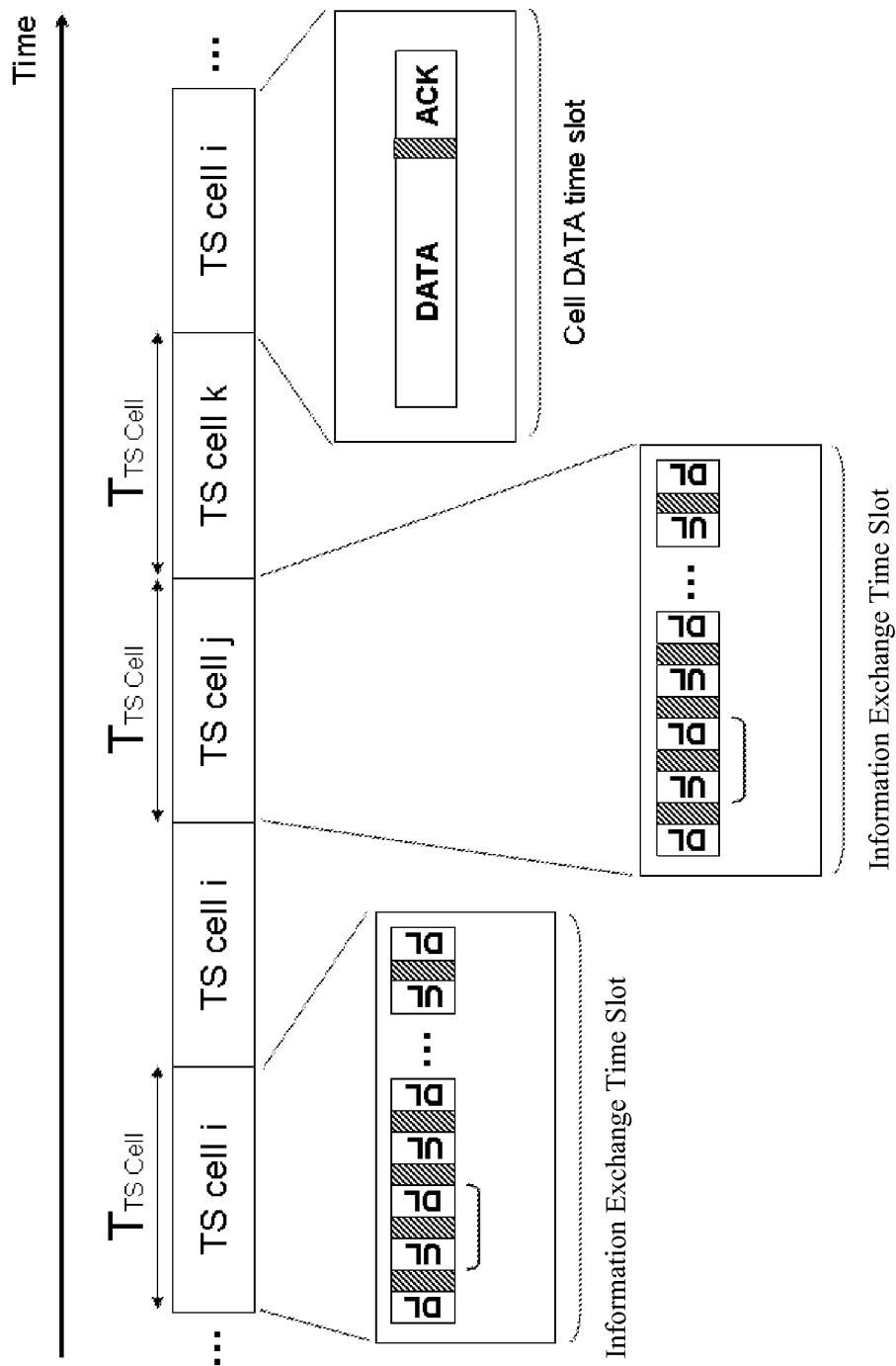
FIG. 2 illustrates an example of a time frame structure in accordance with some embodiments of the invention.

Specifically, FIG. 2 illustrates an example of a time frame structure that may be used by the system of FIG. 1. In the example, the time frame comprises a number of time slots which are allocated to a cell and which are either information exchange time slots or data slots. In the example, two time slots are allocated as information exchange time slots to cell i, e.g. the cell supported by the first central node 107, the next time slot is allocated as an information exchange time slot to cell j, e.g. the cell supported by the second central node 109, the next time slot is allocated as an information exchange time slot to cell k (e.g. a cell supported by a central node not illustrated in FIG. 1), and the next time slot is allocated to cell i as a data time slot.

Figure 3:
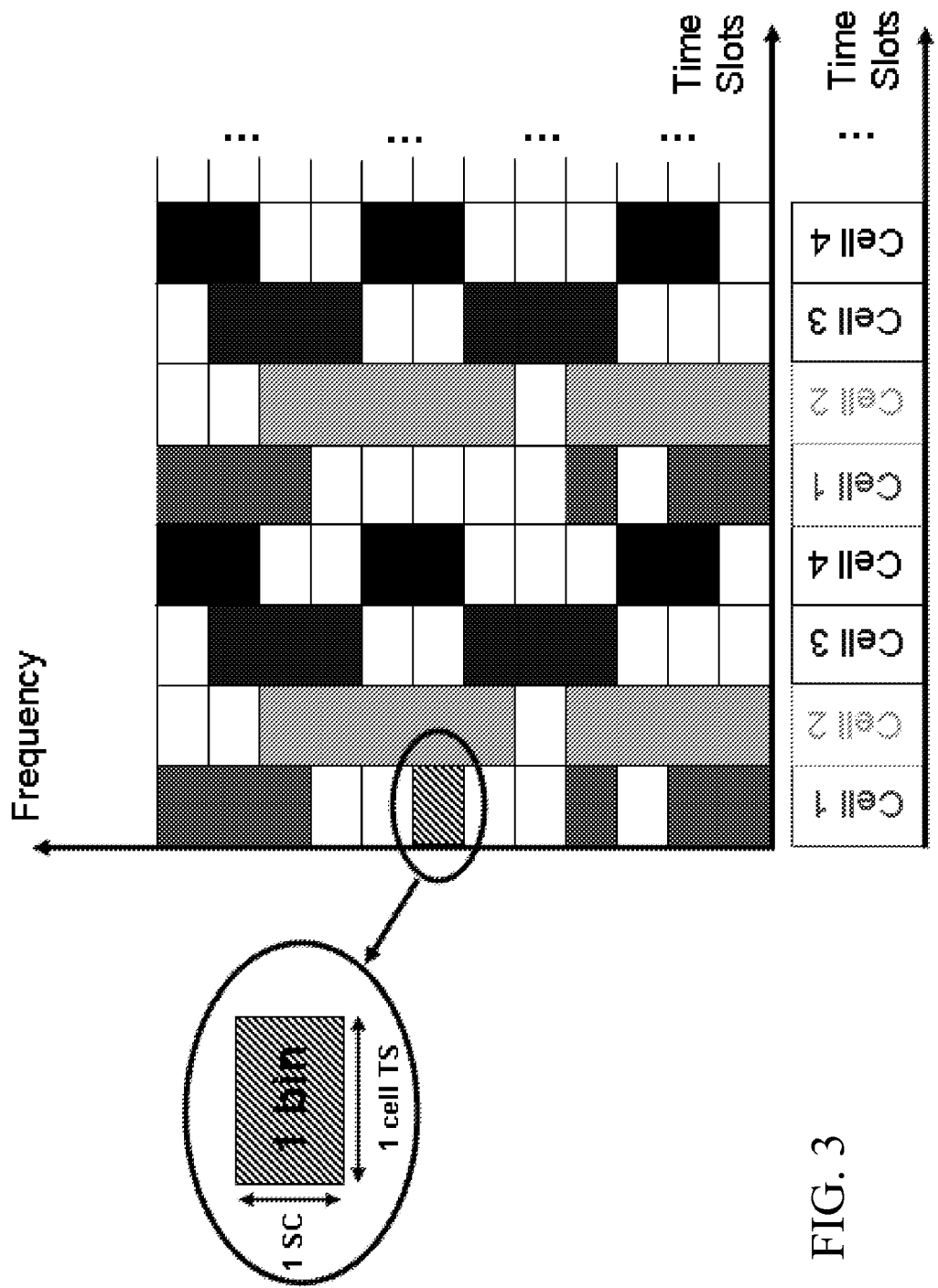
FIG. 3 illustrates an example of a resource allocation of resource bins in accordance with some embodiments of the invention.

In the system, the frequency resource is considered in resource units corresponding to an allocation of one OFDM subcarrier for one time data slot in one cell. Henceforth, such a resource unit will be referred to as a resource bin. FIG. 3 illustrates an example of a resource allocation of resource bins that may arise from the described approach.

During the information exchange time slots, the remote nodes 101-105 uplink requests for resource to the central nodes 107, 109. The requests comprise an indication of the channel quality for the uplink communication from that remote node 101-105. The central nodes 107, 109 generate a combined indication of the total received requests with the indication furthermore indicating the channel characteristics for the received requests. The central nodes 107, 109 then broadcast the combined indication to all the remote nodes 101-105. The remote nodes 101-105 evaluate the received combined indication(s) and compare their individual channel quality to this. Depending on the comparison the individual remote node 101-105 may decide not to contend for the resource bin or may decide to continue to contend for the resource bin. In particular, remote nodes 101-105 having channel qualities which are poor in comparison to the qualities of other remote nodes 101-105 will decide to abandon the resource request, whereas remote nodes 101-105 with good channel quality will decide to continue and will transmit a second request to the central node 107, 109. The central node 107, 109 will in this iteration only receive requests from the best remote nodes 101-105 of the previous iteration and therefore the combined channel indication will reflect improved channel qualities. The combined channel indication is broadcast and the process is iterated.

At a given point, the remote node 101-105 may decide that it is the winner of the resource bin. For example, if the combined channel indication and the channel quality for the remote node 101-105 is the same, this is likely to be an indication that all other remote nodes 101-105 have abandoned the request. The remote node 101-105 then proceeds to use the resource bin in the next data time slot allocated to the cell.

Figure 4:
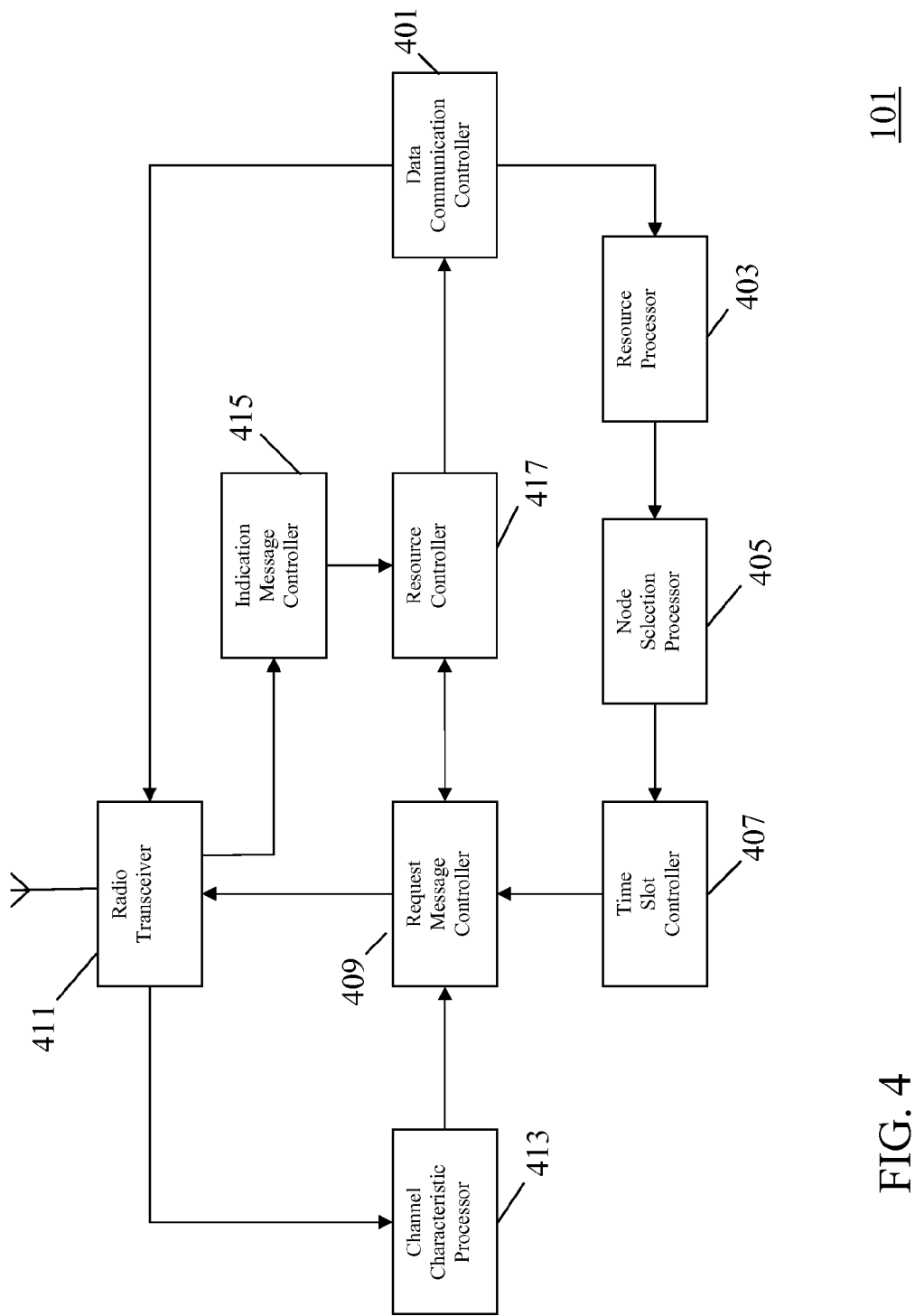
FIG. 4 illustrates an example of a remote node in accordance with some embodiments of the invention.
Figure 5:
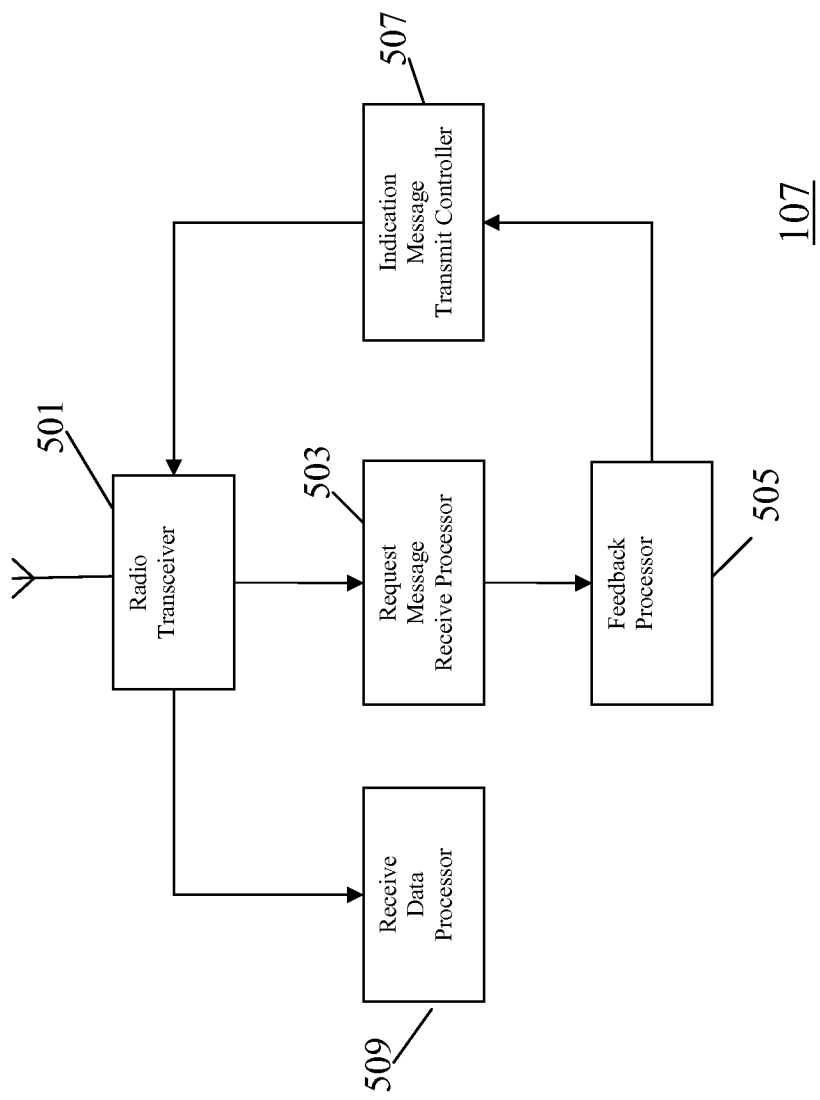
FIG. 5 illustrates an example of a central node in accordance with some embodiments of the invention.

FIG. 4 illustrates an example of a remote node in accordance with some embodiments of the invention and FIG. 5 illustrates an example of a central node in accordance with some embodiments of the invention. The remote node of FIG. 4 may specifically be the first remote node 101 of FIG. 1 and the central node of FIG. 5 may specifically be the first central node 107 of FIG. 1.

The first remote node 101 comprises a data communication controller 401 which receives data for uplink transmission to the infrastructure system comprising the central nodes 107, 109 and the interconnecting network 111. The data communication controller 401 can specifically comprise a data buffer wherein data for a streaming service can be stored until it can be transmitted to the central nodes 107, 109.

The data communication controller 401 is coupled to a resource processor 403 which is fed information of the amount of data the data communication controller 401 intends to transmit in the uplink direction.

For example, the data communication controller 401 can inform the resource processor 403 of the communication service which is currently being supported or which it desires to set up. In response, the resource processor 403 can determine the amount of resource that the first remote node 101 should attempt to obtain. Specifically, for a range of predetermined services, the resource processor 403 can comprise a predetermined value for the number of resource bins that are required or desired in order to support the service. For example, the resource processor 403 can have a look-up table indicating that a streaming video service requires a higher number of resource bins than a streaming voice service or a non-real time email service.

In the specific example, the resource processor 403 comprises a predetermined value for each possible communication service which indicates the maximum number of resource bins that the first remote node 101 should contend for and/or which it may simultaneously support. In addition, a minimum number of resource bins necessary to support the service may also be stored in the resource processor 403.

When a new communication service is initiated by the data communication controller 401, it provides an indication of the service to the resource processor 403 which accordingly determines the maximum and minimum number of resource bins e.g. from predetermined values.

Thus, each service can be characterized by a minimum ($b_{min}$) and a maximum ($b_{max}$) number of bins. The values are the total number of resource bins for all cells and the remote node may use all of the resource bins in the same cell or can distribute the resource bins among different cells. However, each remote node must ensure that it stays within the total resource bin limits allowed by the specific service. This approach allows a practical way of controlling the number of resource requests that compete for the available resource.

The resource processor 403 is coupled to a node selection processor 405 which is arranged to select one or more of the available group of overlapping cells to request resource from. The node selection processor 405 selects one or more of the central nodes 107, 109 for which it will attempt to obtain one or more resource bins. For example, if a maximum number of five resource bins are allowed within a given time frame, the node selection processor 405 can e.g. select to contend for two resource bins from the first central node 107 and for three resource bins from the second central node 109.

The node selection processor 405 can select the central node(s) 107, 109 from which to obtain resource in response to any suitable criterion and/or algorithm. For example, in some embodiments the node selection processor 405 can select to contend for the resource bins of the central node 107, 109 which is received with the highest signal level and/or signal to noise ratio subject to a constraint of a maximum number of subcarriers to request from one central node 107, 109.

The load processor 403 is coupled to a time slot controller 407 which is arranged to identify the time slots that are allocated to each of the selected central nodes 107, 109. Thus, in the specific example, the time slot controller 407 identifies the first information exchange time slot which is allocated to the first central node 107 and a first information exchange time slot which is allocated to the second central node 109.

It will be appreciated that any suitable approach for identifying time slots allocated to specific central nodes 107, 109 can be used in the system. For example, in some systems the time slot allocation for a given time frame may be broadcast to the remote nodes 101-105 in a control time slot of the previous time frame.

The time slot controller 407 is coupled to a request message controller 409 which is arranged to transmit resource request messages to the central nodes 107, 109. The request message controller 409 is coupled to radio transceiver 411 which is capable of communicating with the central nodes 107, 109 over the air interface of the system.

The request message controller 409 is furthermore coupled to a channel characteristic processor 413 which is further coupled to the radio transceiver 411. The channel characteristic processor 413 is arranged to determine a channel characteristic for the uplink communication channel and thus in the current exemplary scenario between the first remote node 101 and the first central node 107.

In the specific example, the capacity indication for the communication channel is determined. The capacity indication can specifically be a signal to noise or signal to interference ratio indication for the communication channel between the first remote terminal 101 and the central nodes 107, 109. As another example, the capacity indication can be a path loss indication.

The channel characteristic processor 413 can use any suitable algorithm to determine the channel characteristic. Specifically, the channel characteristic processor 413 can exploit the correlation between the uplink communication channel and the downlink communication channel for a TDD system to determine a capacity characteristic based on signals (e.g. pilot signals) received from the central nodes 107, 109.

As a specific example, the central node 107 may transmit a pilot signal at a known signal level. By measuring the received signal level, the channel characteristic processor 413 can calculate the path loss as the difference between the transmitted and received power. For a TDD system, the uplink channel and the downlink channel tend to be very closely correlated and accordingly the downlink path loss can be considered to closely correspond to the uplink path loss. This path loss may be used directly as a capacity indication of the capacity that can be supported in the uplink direction (e.g. in terms of the transmit power and/or the constellation symbol order that can be used for a given transmit power).

Furthermore, assuming the same transmit power is used by all remote nodes 101-105, the path loss is a direct indication of the uplink signal to noise or interference ratio at the central node 107. For varying transmit powers, the first remote node 101 can determine the signal to noise or interference ratio taking the specific transmit power into account.

The channel characteristic is fed to the request message controller 409 which includes an indication of this in the resource request message. Specifically, the request message controller 409 performs a duration modulation of the resource request message such that the duration of the transmission to the central node 107 provides an indication of the channel characteristic. Specifically the duration is encoded such that a longer duration is an indication of a lower capacity of the communication channel.

In the system, the information exchange time slots are divided into a number of time intervals as illustrated in FIG. 2. The time intervals comprise a repeating sequence of uplink time intervals, wait time intervals (in which no transmissions are made) and downlink time intervals. The request message controller 409 transmits the resource request message in the first uplink time interval of the first information exchange time slot allocated to the selected first central node 107.

In particular, the resource request message can consist in transmitting an OFDM symbol with a fixed amplitude for all subcarriers corresponding to a requested frequency bin and with no signal transmitted in subcarriers that do not correspond to requested frequency bins. The duration of the OFDM symbol depends on the capacity indication.

The central node 109 of FIG. 5 comprises a radio transceiver 501 which is operable to communicate with the remote nodes 101-105 over the air interface of the system. The radio transceiver 501 will specifically receive the signals during the uplink time intervals of the information exchange time slots and feed these to a request message receive processor 503 coupled to the radio transceiver 501.

In each uplink time interval, all remote nodes contending for the corresponding resource bins transmit resource request messages starting at the start of the time interval and having a duration that depends on the capacity indication. Specifically, the larger the capacity indication, the lower the duration. During such an uplink time interval, the radio transceiver 501 and the request message receive processor 503 thus receive a composite signal containing signal components for all the contending remote nodes 101-105. The received signal level in a given subcarrier is thus an indication of how many remote nodes 101-105 contend for the resource bin of that subcarrier.

Figure 6:
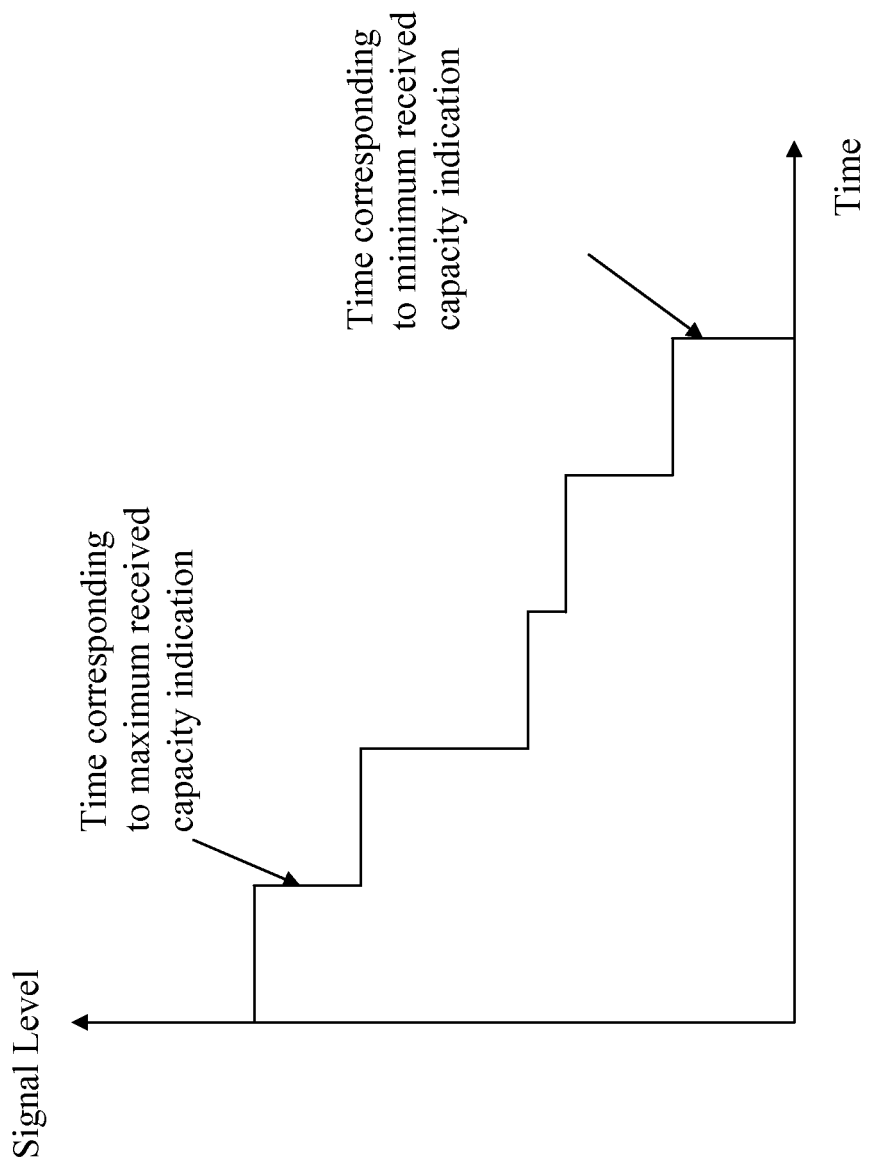
FIG. 6 illustrates an example of a determination of a combined channel characteristic in accordance with some embodiments of the invention.

Furthermore, as illustrated in FIG. 6, the initial signal level is high as it includes all the remote nodes 101-105 contending for the resource bin but as remote nodes 101-105 finish their transmissions due to the duration modulation, the signal level reduces to provide an indication of the number of remote nodes 101-105 with lower capacity indications (i.e. higher path loss values).

The request message receive processor 503 is coupled to a feedback processor 505 which uses the received signal levels to determine an indication of the number of remote nodes contending for a resource bin as well as the channel characteristics of these. The request message receive processor 503 can thus determine a combined channel characteristic for the remote nodes contending for a given resource bin.

In the specific example, the feedback processor 505 determines the highest capacity indication and the lowest capacity indication (for each subcarrier) for the received request messages. For example, the duration of the request messages may be quantised to discrete quantised values such that the remote nodes 101-105 can only end their transmission at specific times. The feedback processor 505 can then determine the largest received capacity indication as that corresponding to the quantisation time instant where the signal level drops by more than a predetermined amount. Likewise, it can determine the minimum capacity indication as the capacity indication corresponding to the quantisation time instant where the signal level drops below a predetermined threshold.

The central node 107 furthermore comprises an indication message transmit controller 507 which is coupled to the feedback processor 505 and the radio transceiver 501. The indication message transmit controller 507 receives the determined combined channel characteristics from the feedback processor 505 and generates an indication message comprising an indication of these. It then proceeds to control the radio transceiver 501 to broadcast this indication message to all the remote nodes 101-105 during the downlink time interval which follows the uplink time interval in which the resource requests were transmitted from the remote nodes 101-105.

The first remote node 101 further comprises an indication message controller 415 which is coupled to the radio transceiver 411 and which receives the indication message broadcast from the first central node 107. The indication message controller 415 then extracts the maximum and minimum capacity indications and feed these to a resource controller 417 which is further coupled to the request message controller 409 and the data communication controller 401.

The resource controller 417 evaluates the capacity indication for the first remote node 101 in comparison to the combined capacity indications which are received for all the remote nodes 101-105 requesting a given resource bin. Depending on this evaluation, the resource controller 417 can decide that the first remote node 101 should not use the resource bin as it is better suited for other remote nodes 103-105. Thus the resource controller 417 can determine that the resource request for the given resource bin should be abandoned and that the first remote node 101 should no longer contend for the resource bin. Specifically, if the capacity indication for the first remote node 101 is close to the minimum combined capacity indication and far from the maximum combined capacity indication, the resource controller 417 can determine to abandon the resource request for this resource bin.

However, if the comparison of the capacity indication for the first remote node 101 and the received maximum and minimum capacity indications meets a suitable criterion indicating that the first remote node 101 may potentially have the highest capacity indication, the resource controller 417 can decide to continue to contend for the resource bin.

As an example, the resource controller 417 can determine a threshold as the mid-point between the maximum capacity indication and the minimum capacity indication and can decide to abandon the resource contention if the capacity indication for the first remote node 101 is below this threshold.

If the resource request/contention is not abandoned, the resource controller 417 controls the request message controller 409 to transmit a second resource request message in the second uplink time interval of the information exchange time slot allocated to the first central node 101. The process described for the first uplink and downlink time intervals are then repeated.

However, as the second time slot will only comprise requests from remote nodes 101-105 which have capacity indications sufficiently close to the maximum capacity indication, the minimum capacity indication will be lower in the second iteration. Accordingly, in the second iteration the requirement for staying in the contention process will be higher (e.g the midpoint threshold will be higher). Accordingly, an improved comparison between the capacity indications for the surviving remote nodes 101-105 can be performed in the selection processor 417.

This process may then be iterated until the resource controller 417 decides to abandon the resource request or decides that the resource bin should be used by the first remote node 101. The resource controller 417 can for example decide that the resource bin should be used by the first remote node 101 if the capacity indication of the first remote node 101 is sufficiently close to the maximum combined capacity indication recorded from the first central node 107.

If the resource controller 417 decides that the first remote node 101 should use the resource bin, it informs the data communication controller 401 to use the resource bin during the next data time slot allocated to the first central node 107.

The data time slot is divided into three consecutive time intervals. In the first time interval the uplink data transmission is performed. The second time slot corresponds to a waiting time slot and a third time slot is an acknowledgement time slot used to indicate whether the data packet was correctly received. The first central node comprises a receive data processor 509 which is fed the received uplink data packet and which is arranged to process and route the data packet to the appropriate destination.

Thus, the information exchange phase performed during the information exchange time slot for the first central node 107 provides an iterative and generally converging process for allocating the resource bins of the first central node 107 to the remote nodes 101-105 which can most effectively use the resource. Furthermore, the resource allocation is achieved by a distributed resource allocation system wherein the centralised infrastructure comprises no decision functionality but only act to facilitate information exchange between the individual remote nodes 101-105. Furthermore, each of the individual remote nodes 101-105 makes individual decisions of whether to use the resource bin or not. This allows an extremely efficient system and improved resource allocation.

In a given time frame, the first remote node 101 may contend for resource bins in a plurality of cells. The described time frame structure allows this to be achieved simply by repeating the described process for the cells for which resource is requested. Accordingly the time slot controller 407 can specify a plurality of information exchange time slots in which the first remote node 101 should transmit resource requests. Accordingly, the described approach for the first central node 107 may be repeated for the second central node 109 and for other central nodes of the group of cells. Specifically, the described frame structure provides a convenient, reliable and efficient way of implementing a distributed and automatic resource allocation for a plurality of interconnected and cooperating cells.

It will be appreciated that in some scenarios, the decision of whether to request resource from a given cell depends on whether the remote node was successful in obtaining resource bins in previous cells.

For example, the first remote node 101 may always contend for the maximum number of allowed resource bins for a given service from the cell allocated the first information exchange time slot of the time frame. If none of these resource bins end up being taken by the first remote node 101, it may then proceed to contend for the maximum number of allowed resource bins from the next selected cell of the group of overlapping cells. However, if the first remote node 101 is successful for a previous cell, the number of resource bins for which it contends may be reduced accordingly.

In other scenarios or embodiments, the number of resource bins for which the remote node contends may be independent of the number of resource bins allocated from other cells. For example, a maximum number of resource bins may be specified for each cell, and the remote node may contend for this number of resource bins in all selected cells.

In the specific example, the information exchange time slots and the data time slots are of substantially the same duration. Specifically, by keeping the time slots of substantially the same duration a facilitated operation can be achieved and especially an increased flexibility in assigning time slots to time frames can be achieved. The duration of the individual time slots may for example deviate less than 10% from the average duration of the time slots.

In a system of FIG. 1, the individual time slots of the time frame are allocated to the individual cells by a centralised time slot manager 113. In the example, the time slot manager 113 receives indications of the cell loading from each of the central node 107, 109 and in response it determines how many of the time slots of the time frame should be allocated to each of the cells. Furthermore, the time slot manager 113 may allocate a different number of time slots to different cells in order to provide an efficient resource utilisation. Thus, a heavily loaded cell will typically be allocated more time slots than a less heavily loaded cell.

Furthermore, the time slot manager 113 is arranged to select how many of the time slots allocated to a given cell are allocated as information exchange time slots and how many are allocated as data time slots. The number of information exchange timeslots depends on the number of iterations which are typically required before the process converges towards a single remote node taking the allocation of the resource bin. Accordingly, each central node can monitor the convergence behaviour and report this to the time slot manager 113. If convergence is typically obtained within a given number of time slots for a given cell, the time slot manager 113 can proceed to allocate this number of time slots as information exchange timeslots. Depending on the number of time slots which are available for the cell, one or more data time slots may then be allocated within the time frame. It will be appreciated, that a single information exchange phase/resource bin allocation process can be used for a plurality of data time slots and specifically for all data time slots in a given time frame.

The time slot manager 113 can communicate the time slot allocation to the central nodes 107, 109 via the interconnect network 111. The central nodes 107, 109 can then broadcast the time slot allocations to all the remote nodes 101-105 which are then able to use this information to select the time slots in which to request resource. The time slot allocation and communication for a given timeframe can for example be performed in the previous timeframe.

It will be appreciated that any suitable method or algorithm for allocating time slots to cells can be used without detracting from the invention. For example, in a simple embodiment, a fixed number of information exchange timeslots and data time slots may simply be permanently allocated to each cell of the group of overlapping cells.

Figure 7:
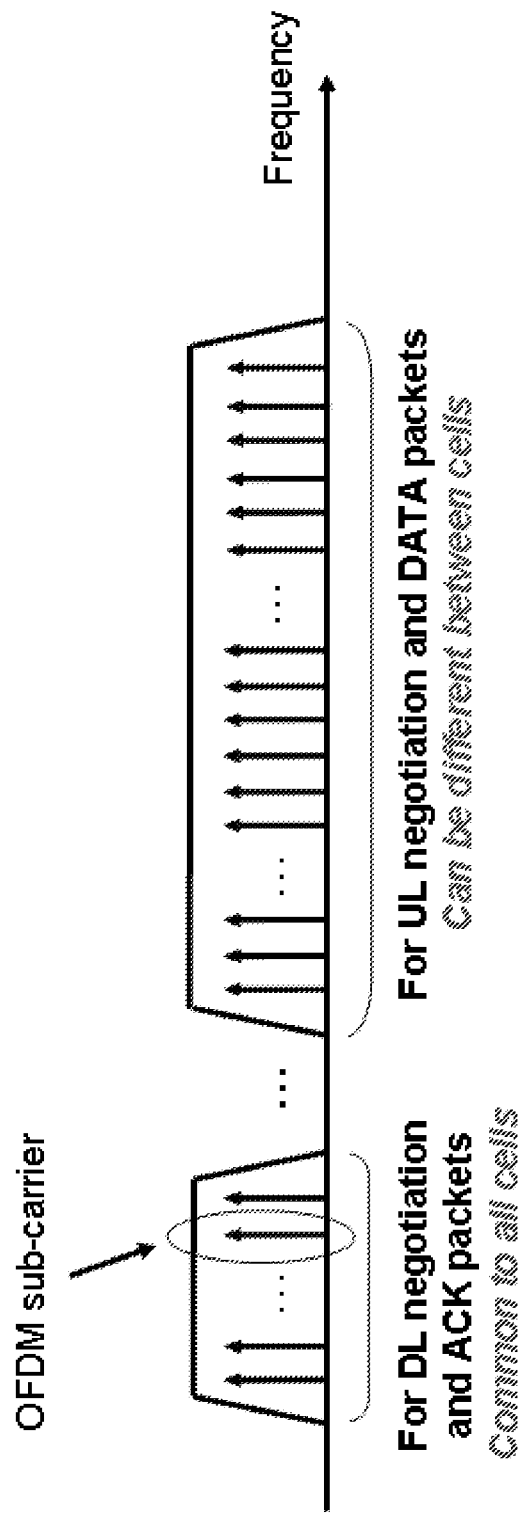
FIG. 7 illustrates an example of an OFDM subcarrier reservation in accordance with some embodiments of the invention.

In some embodiments, a given number of subcarriers may be allocated and reserved for the downlink transmissions. For example, as illustrated in FIG. 7, a group of subcarriers may exclusively be reserved for downlink transmission and may not be used by the remote nodes for uplink transmissions even during the uplink time intervals. These reserved subcarriers can then be used for the downlink transmissions in the information exchange timeslots as well as for the acknowledgement transmissions during the data time slots.

The use of reserved downlink subcarriers may in theory reduce the capacity available for uplink transmissions but can provide a more reliable system. Indeed, in a typical system, a number of other non-synchronised cell groups may be operating nearby. As the cell groups are not synchronised with each other (although the cells within a given group are synchronised), time division cannot be relied upon to provide interference separation and therefore uplink transmissions in one cell group may interfere with downlink transmissions in another cell group. As the remote nodes may be close to each other, this can create significant interference to the critical downlink transmissions and may result in degraded resource allocation. However, by reserving a number of subcarriers exclusively for the downlink transmissions in all cell groups, the interference caused to downlink transmissions by uplink transmissions in other cell groups can be substantially reduced thereby resulting in an increased robustness and improved performance of the system as a whole.

It will be appreciated that the described system provides a number of advantages and features. Specifically, the system provides for distributed uplink spectrum allocation for multiple cells. The process is able to dynamically adapt the temporal and spatial spectrum allocation to the current conditions and traffic variations. Specifically, the system can increase the total uplink capacity for multiple cells taking into account the channel conditions and reuse constraints. The system also provides robustness and flexibility with respect to the number of remote nodes and available spectrum resource per cell. The system can be considered to be based on a virtual cell concept where the virtual cell corresponds to the group of overlapping cells. Specifically, a remote node can transmit to one or more central nodes depending on the conditions and resource requirements.

Furthermore, the use of maximum and minimum resource bins for a given service allows an efficient management of performance and especially the Quality of Service.

In the system, the individual remote nodes have control over their own resource bin allocation and scheduling and the resource allocation is not the responsibility of the cell infrastructure but is achieved by simple separate processes in the remote nodes.

Furthermore, the system allows this approach without relying on complex centralised decision processes. However, at the same time the system does not require that all individual remote nodes can communicate directly with each other. Rather, indirect communications via the central nodes are used to achieve the information exchange.

In addition to the flexibility, scalability, robustness etc, the system also allows a reduction of the burden and cost associated with resource planning for operators.

The system provides these features simply by the remote nodes following a few simple behavioural rules. The system can specifically be considered to use a swarm intelligence approach.

A swarm intelligence meta-heuristic is a natural model (inspired from the behaviour of social insects) of distributed problem solving requiring no external guidance or central control. Users use only local information for decision-making and they have no global knowledge of the system.

Self-organization is characterized by the emergence of sometimes complex structures at the global level, as a result of multiple simple interactions at the local level. The global emerging structures accomplish some function (problem solving) with flexibility (environment adaptation), and robustness (structures spontaneously re-form in case of mistakes or variation in number of individuals).

In the described system, the uplink spectrum allocation for multiple cells is an emergent property of the individual decisions of the remote nodes.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the communication system comprising:
    a plurality of remote nodes each comprising a computing device and non-transitory memory in communication with the computing device, the non-transitory memory storing instructions that, when executed by the computing device, cause each of the remote nodes to implement:
        a resource processor for determining a requirement for uplink resource;
        a node selection processor for determining a first central node from which to request uplink resource, wherein the node selection processor can select the first central node as any central node of a plurality of central nodes each of which supports a cell of the plurality of cells;
        a channel characteristic processor for determining a channel characteristic for the uplink communication channel between the remote node and the first central node;
        a time slot controller for determining a first information exchange time slot of the time frame allocated to the first central node;
        a request message controller for transmitting a resource request for at least one subcarrier of a data time slot to the first central node in the first information exchange time slot, the resource request comprising an indication of the channel characteristic;
        an indication message controller for receiving an indication message from the first central node in the first information exchange time slot, the indication message comprising a combined channel indication of the received channel conditions for all received resource requests for the at least one subcarrier in the first information exchange time slot;
        a resource controller for performing a sequence comprising:
            when the resource controller determines the channel quality for an uplink communication from the remote node is below a threshold, abandoning the request; and
            when the resource controller determines the channel quality for the uplink communication from the remote node is above the threshold, repeating the transmission of the resource request and continuing to contend for the requested resource:
            wherein the resource controller performs one or more additional iterations of the sequence using a successively higher threshold for each iteration until either the resource controller decides to abandon the request or the resource controller decides to use the at least one subcarrier in the data time slot; and
        a data communication controller for transmitting uplink data to the first central node on the at least one subcarrier in the data time slot when the resource controller decides to use the at least one subcarrier in the time slot;
        wherein at least one of the plurality of remote nodes is arranged to transmit resource requests to a plurality of central nodes in a single time frame.

2. The OFDM communication system of claim 1 wherein each of the plurality of remote nodes is arranged to transmit a second resource request for at least one subcarrier of a different data time slot to a second central node only if the resource controller determines to abandon the resource request for the at least one subcarrier in the data time slot of the first central node.

3. The OFDM communication system of claim 1 wherein each of the plurality of remote nodes is arranged to transmit a second resource request for at least one subcarrier of a different data time slot to a second central node independently of whether the resource controller determines to abandon the request for the at least one subcarrier of the data time slot of the first central node.

4. The OFDM communication system of claim 1 wherein the node selection processor is arranged to select the first central node in response to channel characteristics for uplink communication channels to central nodes of the plurality of cells.

5. The OFDM communication system of claim 1 wherein the node selection processor is arranged to select a plurality of central nodes from which to request uplink resource.

6. The OFDM communication system of claim 5 wherein node selection processor is arranged to determine a number of subcarrier and time slot resource units to request in response to the requirement for uplink resource.

7. The OFDM communication system of claim 6 wherein the number of subcarrier and time slot resource units is bounded by at least one number selected from the group consisting of a minimum number of subcarrier and time slot resource units and a maximum number of subcarrier and time slot resource units.

8. The OFDM communication system of claim 7 wherein the node selection processor is arranged to determine the maximum number of subcarrier and time slot resource units in response to a communication service associated with the resource requirement.

9. A remote node for an Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the remote node comprising:
    a computing device; and
    non-transitory memory in communication with the computing device, the non-transitory memory storing instructions that, when executed by the computing device, cause each of the computing device to implement:

a resource processor for determining a requirement for uplink resource;

a node selection processor for determining a first central node from which to request uplink resource, wherein the node selection processor can select the first central node as any central node of a plurality of central nodes each of which supports a cell of the plurality of cells;

a channel characteristic processor for determining a channel characteristic for the uplink communication channel between the remote node and the first central node;

a time slot controller for determining a first information exchange time slot of the time frame allocated to the first central node;

a request message controller for transmitting a resource request for at least one subcarrier of a data time slot to the first central node in the first information exchange time slot, the resource request comprising an indication of the channel characteristic;

an indication message controller for receiving an indication message from the first central node in the first information exchange time slot, the indication message comprising a combined channel indication of the received channel conditions for all received resource requests for the at least one subcarrier in the first information exchange time slot;

a resource controller for performing a sequence comprising:
  when the resource controller determines the channel quality for an uplink communication from the remote node is below a threshold, abandoning the request; and
  when the resource controller determines the channel quality for the uplink communication from the remote node is above the threshold, repeating the transmission of the resource request and continuing to contend for the requested resource:
  wherein the resource controller performs one or more additional iterations of the sequence using a successively higher threshold for each iteration until either the resource controller decides to abandon the request or the resource controller decides to use the at least one subcarrier in the data time slot; and
  wherein the resource controller provides a distributed resource allocation between the remote node and a plurality of remote nodes, the remote node one of the plurality of remote nodes with no centralized decision functionality from the plurality of cells; and a data communication controller for transmitting uplink data to the first central node on the at least one subcarrier in the data time slot when the resource controller decides to use the at least one subcarrier in the time slot;

wherein the remote node is arranged to transmit resource requests to a plurality of central nodes in a single time frame.

10. A method for a remote node for an Orthogonal Frequency Domain Multiplexing (OFDM) communication system employing a cell time division time frame for a plurality of cells, the time frame comprising time slots with each time slot allocated to one of the plurality of cells and each time slot being either an information exchange time slot or a data time slot, the method comprising:

determining by the remote node a requirement for uplink resource;

selecting by the remote node a first central node from which to request uplink resource, wherein the step of selecting can select the first central node as any central node of a plurality of central nodes each of which supports a cell of the plurality of cells;

determining by the remote node a channel characteristic for the uplink communication channel between the remote node and the first central node;

determining by the remote node a first information exchange time slot of the time frame allocated to the first central node;

transmitting by the remote node a resource request for at least one subcarrier of a data time slot to the first central node in the first information exchange time slot, the resource request comprising an indication of the channel characteristic;

receiving by the remote node an indication message from the first central node in the first information exchange time slot, the indication message comprising a combined channel indication of the received channel conditions for all received resource requests for the at least one subcarrier in the first information exchange time slot;

performing by the remote node a sequence comprising:
  determining the channel quality for an uplink communication from the remote node;
  when the channel quality for the uplink communication from the remote node is below a threshold, abandoning the request;
  when the channel quality for the uplink communication from the remote node is above the threshold, repeating the transmission of the resource request and continuing to contend for the requested resource; and
  performing one or more additional iterations of the sequence using a successively higher threshold for each iteration until either deciding to abandon the request or deciding to use the at least one subcarrier in the data time slot; and transmitting by the remote node uplink data to the first central node on the at least one subcarrier in the data time slot when deciding to use the at least one subcarrier in the time slot;

wherein the remote node transmitting resource requests to a plurality of central nodes in a single time frame.

* * * * *